United States Patent
Hauleitner et al.

(10) Patent No.: US 10,280,973 B1
(45) Date of Patent: May 7, 2019

(54) HYBRID ROLLER BEARING, PARTICULARLY FOR REFRIGERANT COMPRESSOR

(71) Applicant: Aktiebolaget SKF, Gothenburg (SE)

(72) Inventors: Rudolf Hauleitner, Steyr (AT); Guillermo Enrique Morales Espejel, Ijsselstein (NL); Aidan Kerrigan, Utrecht (NL); Hans Wallin, Cape Coral, FL (US)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/848,868

(22) Filed: Dec. 20, 2017

(51) Int. Cl.
| | |
|---|---|
| *F16C 19/22* | (2006.01) |
| *F16C 19/04* | (2006.01) |
| *F16C 33/32* | (2006.01) |
| *F16C 33/34* | (2006.01) |
| *F16C 33/58* | (2006.01) |
| *F25B 31/02* | (2006.01) |
| *F16C 19/54* | (2006.01) |

(52) U.S. Cl.
CPC ............ *F16C 19/22* (2013.01); *F16C 19/04* (2013.01); *F16C 19/54* (2013.01); *F16C 33/32* (2013.01); *F16C 33/34* (2013.01); *F16C 33/585* (2013.01); *F25B 31/026* (2013.01); *F16C 2240/54* (2013.01)

(58) Field of Classification Search
CPC .................................................... F16C 2240/54
See application file for complete search history.

(56) References Cited

U.S. PATENT DOCUMENTS

| | | | |
|---|---|---|---|
| 9,670,959 B2 * | 6/2017 | Morales Espejel | F16C 33/36 |
| 2007/0269158 A1 * | 11/2007 | Tsujijimoto | F16C 19/364 384/571 |

* cited by examiner

*Primary Examiner* — James Pilkington
(74) *Attorney, Agent, or Firm* — Bryan Peckjian; SKF USA Inc. Patent Dept.

(57) ABSTRACT

A hybrid roller bearing having an inner raceway and an outer raceway and a plurality of rollers arranged therebetween. The inner raceway and the outer raceway are made from bearing steel and have a first surface RMS roughness $R_{q1}$. At least one roller is made from a ceramic material and has at least at the roller raceway a second surface RMS roughness $R_{q2}$. The roughness of the raceways $R_{q1}$ is 1.2 to 4 times higher than the roughness $R_{q2}$ of the at least one roller, as well as a refrigerant compressor with such a hybrid roller bearing.

11 Claims, 1 Drawing Sheet

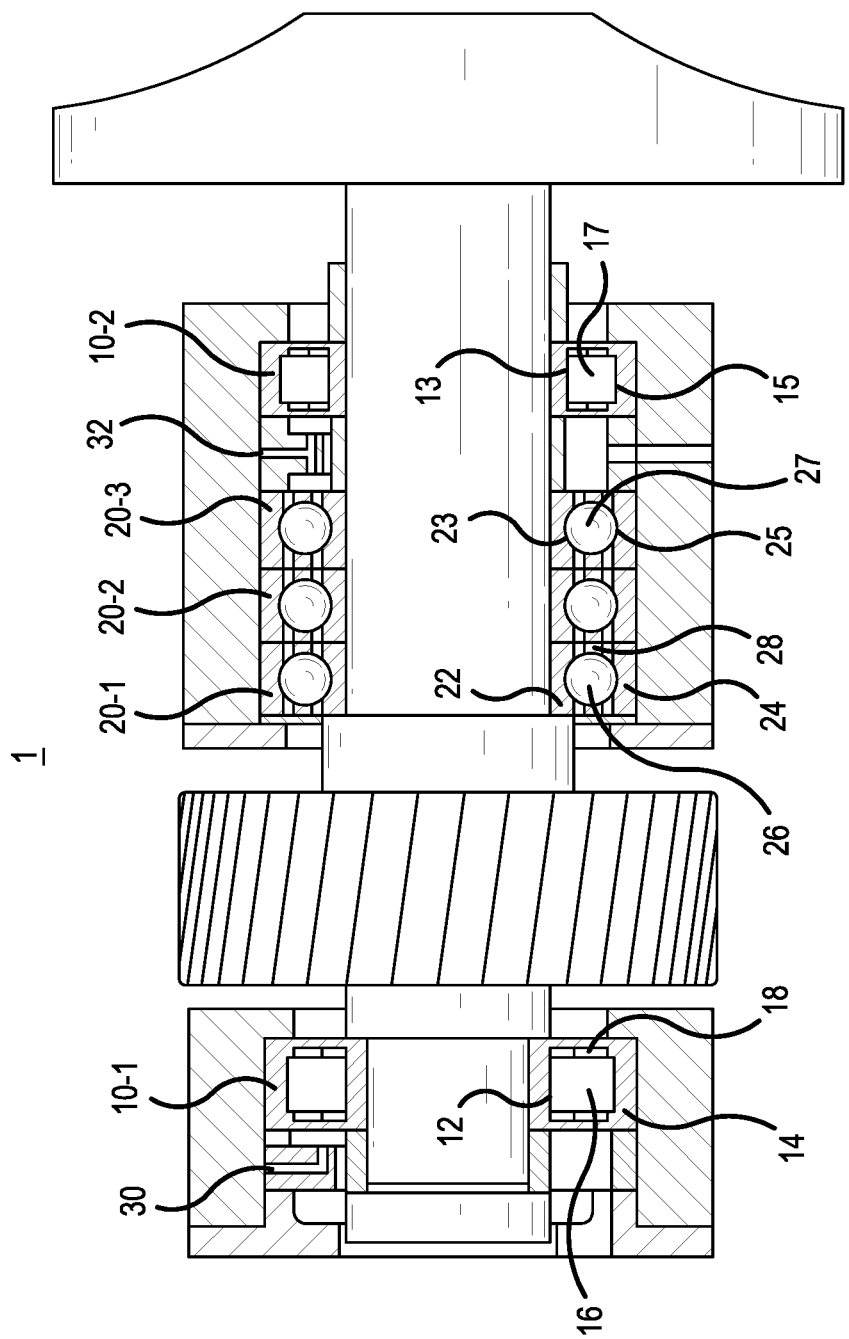

HYBRID ROLLER BEARING, PARTICULARLY FOR REFRIGERANT COMPRESSOR

TECHNOLOGICAL FIELD

The present invention relates to a hybrid roller bearing as well as to a refrigerant compressor comprising such a hybrid roller bearing.

BACKGROUND

Hybrid rolling bearings are often used in very demanding environments, for example in applications with reduced lubrication conditions and/or in high speed and/or high temperature applications. With the increased severity of the working conditions, e.g. heavier loads in combination with higher temperatures, thinner lubrication films and/or poor lubrication conditions the bearing components can suffer from surface initiated fatigue, so called micropitting. Even if micropitting is not necessarily a primary failure mode, it can facilitate/accelerate the appearance of other failures like indentation, surface initiated spalling and seizure.

Thus, micropitting is one of the mechanisms responsible for life-limiting bearing wear. One approach to mitigate the effects of micropitting is to ensure that the rolling contact surfaces in a bearing are always separated by a lubrication film of sufficient thickness.

This is not possible in ultra-thin lubrication film thickness (UTFT) applications. UTFT applications in rolling bearings refer to conditions when the separation of surfaces by a lubricating film is compromised by:

(i) low viscosity of the lubricant i.e. fluids with a dynamic viscosity lower than 1 cST and/or (ii) lubricant starvation i.e. a condition where the available lubricant layer in the rolling contact inlet cannot guarantee fully flooded conditions in the bearing.

In both conditions the overall lubricant layer thickness at the contact surfaces is limited to 300 nm or less. This can happen because the bearing is lubricated with grease (limited lubricant release) or the lubricant evaporates before reaching the contact (volatile fluids) or there is limited lubricant supply by the lubrication system.

Additionally, many of these UTFT applications use media lubrication, like pure refrigerant lubrication, oil-refrigerant mixture lubrication, fuels (kerosene, diesel, gasoline, natural gas, alcohols) lubrication, and/or grease combined with media lubrication. Water lubrication is excluded. For pure refrigerant lubrications, the resulting lubricant film thickness is even significantly less than 300 nm, typically in the range of 30 nm.

The main failure mode of these rolling bearings is wear assisted by corrosion. Wear due to solid-to-solid contact enhanced by corrosion can modify the raceway profile, increase the clearance and concentrates local stresses that could develop spalls. Another important failure mode of these bearings is solid contamination. Since these applications work with very thin film thicknesses (e.g. less than 300 to 200 nm) any solid particle (debris, sand, oil soot, etc.) even the very small ones can produce damage in the contact surfaces and can modify the topography disrupting the film build-up capability of the original surface. Excessive contamination can also generate high friction forces that will hinder/block the rotation of the bearing and can produce fractures in the cage or seizure in the raceways and rolling elements.

Therefore, it has been proposed in the state of the art to employ surface engineering techniques and to provide a roughness for the raceways of the bearing rings and a roughness of the rolling elements which are as equal as possible, in order to reduce micropitting and improve the wear and fatigue life of bearings. This is based on the understanding that a rougher rolling contact surface imposes load micro cycles on a smoother, opposing rolling contact surface, in the presence of sliding and in the absence of full-film lubrication. Dis-advantageously, in practice, even in ordinary steel-steel bearings, the raceways of a bearing are generally somewhat rougher than the rolling elements. In hybrid rolling bearings the difference between the roughnesses is even greater.

It is therefore object of the present invention to provide a hybrid rolling bearing which may be used in ultra-thin lubrication film thickness applications, particularly in a refrigerant compressor device, and which has an improved corrosion and micropitting resistance.

SUMMARY

This object is solved by a hybrid roller bearing according to the disclosure and a refrigerant compressor comprising such a bearing.

In contrast to the latest efforts to provide hybrid roller bearings having substantially the same roughness values for raceways and rollers, the inventors have surprisingly found that micropitting and corrosion induced wear of a hybrid roller bearing may be significantly reduced if the roughnesses of the contacting surfaces of the hybrid roller bearing, particularly in mint conditions, is engineered to be within predefined boundaries.

Consequently, in the following a hybrid roller bearing comprising an inner raceway and an outer raceway and a plurality of rollers arranged therebetween, is proposed, wherein the outer raceway and the inner raceway are made from bearing steel and have a first surface RMS roughness $R_{q1}$, and wherein at least one roller is made from a ceramic material and has a second surface RMS roughness $R_{q2}$. In case the roughness of the raceways $R_{q1}$, preferably in mint conditions, is 1.2 to 4, preferably 1.5 to 3, times higher than the roughness $R_{q2}$ of the at least one roller, preferably in mint conditions, the inventors have found that micropitting and/or corrosion induced wear may be significantly reduced.

The hybrid roller bearing is preferably a cylindrical roller bearing, but may be any one the known types, e.g. a spherical roller bearing, a tapered roller bearing or a toroidal roller bearing or combinations thereof.

The predetermined roughnesses allow for avoiding any solid-to-solid contact even at mint conditions and under ultra-thin lubrications film operating conditions of the hybrid roller bearing, even for pure refrigerant lubricated applications, where the resulting lubrication film is in the range of 30 nm.

According to a preferred embodiment of the hybrid roller bearing, the combined surface RMS roughness $R_q$ of raceways and rollers is $R_q \leq 5 \times 10^{-8} (1000\, d_m)^{0.2}$ [meter], wherein $R_{q1}$ is defined as $R_q = \sqrt{R_{q1}^2 + R_{q2}^2}$.

It is further preferred, if the hybrid roller bearing is provided with a combined roughness skewness $R_{sk}$ of raceways and rollers of $R_{sk} \leq 0$, wherein $R_{sk}$ is defined as $$R_{sk} = \frac{R_{sk1} R_{q1}^3 + R_{sk2} R_{q2}^3}{R_q^3}.$$

According to a further preferred embodiment, the hybrid roller bearing has a combined roughness slope parameter $R_{\Delta qx}$ of raceways and rollers of $R_{\Delta qx} \leq 50$ [mrad], wherein $iR_{\Delta qx}s$ defined as $$R_{\Delta qx} = \frac{R_{\Delta qx1} + R_{\Delta qx2}}{2}.$$

By providing a hybrid roller bearing being engineered to have the above defined parameters, the ceramic rollers reduce boundary frictions and optimize running-in. Further in poor lubrication and contamination conditions, the proposed ceramic rollers delay the damage progression. In addition, the tight control of the composed roughness helps in the build-up of lubrication films and the improvement of running-in.

According to a further preferred embodiment the hybrid roller bearing has an osculation Φ, which ranges between 1.02 and 1.1, wherein Φ is defined as $$\Phi = \frac{2r_{i,e}}{D_w},$$

with $r_{i,e}$ being the raceway radius of the inner raceway or the outer raceway, and Dw being the diameter of the roller. The proposed osculation gives a balance between low friction forces at the surface and high contact stresses, so bearing life is optimized.

It is further advantageous, if at least one raceway of the proposed hybrid roller bearing is made from a hardened corrosion-resistant steel, having a corrosion resistance with a pitting potential of at least 25 mV higher than the stainless steel reference (AISI 440C) according to ASTM G61-86. Additionally or alternatively, the used steel has an after-heat-treatment hardness of ≥58 HRC and/or a fracture toughness of at least 14 MPa m$^{1/2}$ (see ASTM-E399-12).

Further, it is preferred that at least one roller of the hybrid roller bearing is made from silicon nitride ($Si_3N_4$). This, in combination with the selected corrosion-resistant properties of the steel, allow for low wear development in the hybrid roller bearing, since in this case wear is dependent on the steel hardness and the chemically aggressiveness of the environment (corrosion assisted wear).

According to a further preferred embodiment, the rollers of the proposed hybrid roller bearing are encompassed by a cage, which is preferably made from a fiber-enforced material, preferably from a glass-fiber enforced PEEK or a carbon fiber material. The fiber-enforced material of the cage prevents cage fracture in heavy contamination environment.

All these features alone or in combination ensure a long duration of the hybrid roller bearing even in the specified conditions of ultra-thin lubrication film thickness conditions. This could not be achieved without the above described features.

Hence, according to a further preferred embodiment, the proposed hybrid roller bearing is lubricated by means of an ultra-thin lubrication film arranged between the rollers and the raceways, wherein the lubrication film thickness is less than 300 nm. Thereby, it is even more advantageous, if the hybrid roller bearing is lubricated with pure refrigerant or a refrigerant/oil mixture forming an elasto-hydrodynamic lubricant film between the rollers and the raceways.

Thus, a further aspect of the invention relates to a refrigerant compressor comprising at least one hybrid roller bearing as described above.

Further advantages and preferred embodiments are disclosed in the claims, the description and the figures. It should be further noted that a person skilled in the art may combine the presented features otherwise than indicated without extending the scope of the invention.

BRIEF DESCRIPTION OF THE DRAWINGS

In the following, the present invention will be described by means of embodiments shown in the figures. The shown embodiments are exemplarily, only, and are not intended to limit the scope of protection. The scope of protection is solely defined by the attached claims.

The figures show:

FIG. 1: a schematic drawing of a refrigerant compressor comprising a hybrid rolling bearing according to a preferred embodiment.

In the following same or similar functioning elements are indicated with the same reference numerals.

DETAILED DESCRIPTION

FIG. 1 shows a sectional view of a refrigerant compressor 1 having an electric motor 2 which drives a shaft 4. The shaft 4 is radially supported by a set of hybrid roller bearings 10-1, 10-2, which are arranged on both sides of the motor 2. Further, the shaft 4 is axially and radially supported by a plurality of hybrid ball bearings 20-1, 20-2, 20-3. The hybrid ball bearings 20 are preferably angular contact ball bearings, which are enabled to support axial and/or radial forces, but may be any other type of ball bearing. The hybrid roller bearings 10 may be any kind of roller bearing, e.g. a cylindrical roller bearing, a spherical roller bearing, a tapered roller bearing or a toroidal roller bearing or combinations thereof.

Each hybrid roller bearing 10-1, 10-2 comprises an inner ring 12 having a raceway 13, an outer ring 14 having a raceway 15, and rollers 16 having raceways 17, which are arranged therebetween. The rollers 16 are further encompassed by a cage 18, which is preferably made from a glass-fiber enforced PEEK material. However, any other fiber-enforced material e.g. a carbon fiber material, may be used for the cage.

Analogously, each hybrid ball bearing 20-1, 20-2, 20-3 comprises an inner ring 22 having a raceway 23, an outer ring 24 having a raceway 25, and balls 26 having surfaces 27, arranged therebetween. Also, the balls 26 are guided by means of a cage 28, which is preferably made from a glass-fiber enforced PEEK material. However, any other fiber-enforced material e.g. a carbon fiber material, may be used for the cage.

Further, it should be noted that the hybrid ball bearings shown in FIG. 1, have a contact angle of 25° to 30°, but it is also possible to use hybrid ball bearings having contact angles in the range of 0° to 45°. Optionally, the hybrid ball bearings and/or the hybrid roller bearings 20-1, 20-2, 20-3 have an osculation Φ, which ranges between 1.02 and 1.1, wherein Φ is defined as $$\Phi = \frac{2r_{i,e}}{D_w},$$

with $r_{i,e}$ being the raceway radius of the inner raceway or the outer raceway, and $D_w$ being the diameter of the ball/roller. The proposed osculation gives a balance between low friction forces at the surface and high contact stresses, so bearing life is optimized.

As is further shown in FIG. 1, the hybrid rolling bearings 10-1, 10-2, 20-1, 20-2, 20-3 are lubricated by lubrication means 30, 32, which are adapted to provide a lubricant to the hybrid rolling bearings 10-1, 10-2, 20-1, 20-2, 20-3. Since the device shown in FIG. 1 is a refrigerant compressor, it is preferred to use the refrigerant itself or a refrigerant/oil mixture as lubricant. This has proven to improve heat transfer in the condensers and the evaporator heat exchangers. Eliminating oil lubricant also eliminates the need for oil maintenance and oil cost.

On the other hand, using pure refrigerant and/or a refrigerant/oil mixture as lubricant, leads to ultra-thin lubrications film thickness (UTFT) conditions due to the refrigerant providing an elasto-hydrodynamic lubrication film with a thickness of less than 200 nm. Since these applications work with very thin film thicknesses (e.g. less than 200 nm) any solid particle (debris, sand, oil soot, etc.) even the very small ones can produce damage in the contact surfaces and can modify the topography disrupting the film build-up capability of the original surface. Excessive contamination, which is also an issue in refrigerant lubricated rolling bearing, can also generate high friction forces that will hinder/block the rotation of the bearing and can produce fractures in the cage or seizure in the raceways and rolling elements.

Thus, in order to improve the wear and fatigue life of hybrid rolling bearings used in the refrigerant compressor, it has already been common knowledge to use a hardened high nitrogen stainless steel, e.g. VC444 steel, and silicon nitride rolling elements for the hybrid rolling bearing.

Additionally, the inventors have found that micropitting and corrosion induced wear of a hybrid roller bearing may be significantly reduced if the roughnesses of the contacting surfaces of the hybrid roller bearing in mint conditions is engineered to be within predefined boundaries. It has been therefore proposed by the inventors to provide hybrid roller bearings 10-1, 10-2, wherein the outer raceway 15 and the inner raceway 13 of the hybrid roller bearings 10-1, 10-2 are made from bearing steel and have a first surface RMS roughness $R_{q1}$, and wherein at least one roller 16 is made from a ceramic material and has a second surface RMS roughness $R_{q2}$. Further it has been suggested that in mint conditions the roughness of the raceways $R_{q1}$ is 1.2 to 4 times higher than the roughness $R_{q2}$ of the at least one roller 16.

The hybrid ball bearings 20-1, 20-2, 20-3 may be any hybrid ball bearing known from the state of the art, but it is further preferred if the roughnesses of the hybrid ball bearings 20-1, 20-2, 20-3 are additionally engineered. Consequently, the outer raceway 25 and the inner raceway 23 of the hybrid ball bearings 20-1, 20-2, 20-3 are also made from bearing steel and have a first surface RMS roughness $R_{q1}$, and wherein at least one ball 26 is made from a ceramic material and has a second surface RMS roughness $R_{q2}$. Further it has been suggested that in mint conditions the roughness of the raceways $R_{q1}$ is 2 to 5 times higher than the roughness $R_{q2}$ of the at least one ball 26.

These predetermined roughnesses allow for avoiding any solid-to-solid contact even at mint conditions and under ultra-thin lubrications film operating conditions of the hybrid roller bearing.

The steel used for the rings and the raceway is preferably a hardened corrosion resistant steel, e.g. VC444 steel. A another example is DIN X30CrMoN15-1 (AMS 5898). In general the hardened corrosion-resistant bearing steel for UTFT conditions refers to a bearing steel with an after-heat-treatment hardness ≥HRC 58 and/or a fracture toughness of at least 14 MPa m$^{1/2}$ (ASTM-E399-12). It is further preferred, if the corrosion resistance has a pitting potential bigger or equal to +25 mV higher than the stainless steel reference (AISI 440C) according to ASTM G61-86. After heat treatments the ring raceways 13, 15, 23, 25 are be machined to dimensions, and the desired roughness is adjusted. The heat treatment usually comprises one of more of the following steps:

Austenitising at 1000° C. to 1150° C.;
Gas quench;
Subzero treatment at −40° C. to −150° C.;
Tempering to certain temperatures for different dimensional stability properties.

Table 1 shows one example of the covered steel: DIN X30CrMoN15-1 (AMS 5898), compared with the reference steel AISI 440 C. It is further shown that different tempering temperatures give different dimensional stability properties for the same corrosion resistant steel.

TABLE 1

Example of corrosion resistant steel parameters

| Steel | Pitting Potential relative to reference. [mV] | Tempering | Hardness |
| --- | --- | --- | --- |
| DIN X30CrMoN15-1 | +25 | At 4000 C. to 5500 C. | ≥58 HRC |
| DIN X30CrMoN15-1 | +375 | At 1500 C. to 2400 C. | ≥58 HRC |
| AISI 440 C. | 0 | Min. of ~2040 C. | ≥58 HRC |

The rolling elements, namely the rollers 16 and the balls 26 of the hybrid rolling bearings 10-1, 10-2, 20-1, 20-2, 20-3, are Silicon Nitride Balls ($Si_3N_4$): The rolling elements 16, 26 are made by most stringent ceramic quality control and grade and have to pass ASTM F2094 or ISO 26602 class I and II with rolling element grade equal or better than G10.

Besides the roughness difference as mentioned above, the inventors have further found that it is preferred to adjust the combined roughness of raceways and rolling elements of the hybrid rolling bearings 10-1, 10-2, 20-1, 20-2, 20-3 used for applications operating under UTFT conditions to predetermined ranges. It has been proven that hybrid rolling bearings 10-1, 10-2, 20-1, 20-2, 20-3 having the roughness values as listed below are particularly resistant to corrosion induced wear even in UTFT conditions:

For the hybrid ball bearings 20-1, 20-2, 20-3, the following values apply:

The combined surface RMS roughness Rq of raceways and balls is $$R_q \leq 4 \times 10^{-9}(1000\ d_m)^{0.55}\ [\text{meter}],\ \text{with}\ R_q = \sqrt{R_{q1}^2 + R_{q2}^2}.$$

The combined roughness skewness Rsk of raceways and balls is $R_{sk} \leq 0$, with $$R_{sk} = \frac{R_{sk1} R_{q1}^3 + R_{sk2} R_{q2}^3}{R_q^3}.$$

The combined roughness slope parameter RΔqx of raceways and balls is $R_{\Delta qx} \leq 8$ [mrad], wherein $$R_{\Delta qx} = \frac{R_{\Delta qx1} + R_{\Delta qx2}}{2}.$$

For the hybrid roller bearings 10-1, 10-2, the following values apply:

The combined surface RMS roughness Rq of raceways and rollers is $R_q \leq 5 \times 10^{-8}(1000\ d_m)^{0.2}$ [meter], with $R_q = \sqrt{R_{q1}^2 + R_{q2}^2}$.

The combined roughness skewness Rsk of raceways and rollers is $R_{sk} \leq 0$, with $$R_{sk} = \frac{R_{sk1}R_{q1}^3 + R_{sk2}R_{q2}^3}{R_q^3}.$$

The combined roughness slope parameter RΔqx of raceways and rollers is $R_{\Delta qx} \leq 50$ [mrad], wherein $$R_{\Delta qx} = \frac{R_{\Delta qx1} + R_{\Delta qx2}}{2}.$$

By providing at least hybrid roller bearings 10-1, 10-2 being engineered to have the above defined parameters, the ceramic rollers reduce boundary frictions and optimize running-in. Further in poor lubrication and contamination conditions, the proposed ceramic rollers delay the damage progression. In addition, the tight control of the composed roughness helps in the build-up of lubrication films and the improvement of running-in. The roughness of the raceways may be adapted by using appropriate honing and grinding processes. The roughness of the ceramic rolling elements may be adapted by using appropriate grinding and lapping processes using diamond abrasives.

REFERENCE NUMBERS

1 refrigerant compressor
2 electric motor
4 compressor shaft
10-1, 10-2 hybrid roller bearing
12 inner ring of the hybrid roller bearing
13 raceway of the inner ring of the hybrid roller bearing
14 outer ring of the hybrid roller bearing
15 raceway of the outer ring of the hybrid roller bearing
16 roller of the hybrid roller bearing
17 raceway of the roller of the hybrid roller bearing
18 cage of the hybrid roller bearing
20-1, 20-2, 20-3 hybrid ball bearing
22 inner ring of the hybrid ball bearing
23 raceway of the inner ring of the hybrid ball bearing
24 outer ring of the hybrid ball bearing
25 raceway of the outer ring of the hybrid ball bearing
26 balls of the hybrid ball bearing
27 surface of the balls of the hybrid ball bearing
28 cage of the hybrid ball bearing
30, 32 lubrications means

What is claimed is:

1. A hybrid roller bearing comprising:
an inner raceway,
an outer raceway, and
a plurality of rollers arranged therebetween, wherein
the inner raceway and the outer raceway are made from bearing steel and have a first surface RMS roughness $R_{q1}$, wherein
at least one roller is made from a ceramic material and has at least at a rolling surface a second surface RMS roughness $R_{q2}$, and wherein
the roughness of the raceways $R_{q1}$ is 1.2 to 4 times higher than the roughness $R_{q2}$ of the at least one roller.

2. The hybrid roller bearing according to claim 1, wherein a combined roughness skewness of the raceways and the rollers is less than 0.

3. The hybrid roller bearing according to claim 1, wherein a combined roughness slope parameter of the raceways and the rollers is ≤50 [mrad].

4. The hybrid roller bearing according claim 1, wherein an osculation Φ of the hybrid roller bearing ranges between 1.02 and 1.1, wherein Φ is defined as $$\Phi = \frac{2r_{i,e}}{D_w},$$

with $r_{i,e}$ being the raceway radius of the inner raceway or the outer raceway, and $D_w$ being the diameter of the roller.

5. The hybrid roller bearing according to claim 1, wherein at least one raceway is made from a hardened corrosion-resistant steel, having a corrosion resistance with a pitting potential of at least 25 mV higher than the stainless steel reference (AISI 440C) according to ASTM G61-86.

6. The hybrid roller bearing according to claim 1, wherein at least one roller is made from silicon nitride ($Si_3N_4$).

7. The hybrid roller bearing according to claim 1, wherein the rollers are encompassed by a cage.

8. The hybrid roller bearing according to claim 1, wherein the hybrid roller bearing is lubricated by means of an ultra-thin lubrication film arranged between the rollers and the raceways, and wherein the lubrication film thickness is less than 300 nm.

9. The hybrid roller bearing according claim 8, wherein the hybrid roller bearing is lubricated with pure refrigerant or a refrigerant/oil mixture forming an elasto-hydrodynamic lubricant film between the rollers and the raceways.

10. The hybrid roller bearing according to claim 1, wherein the rollers are encompassed by a cage that is made from a fiber-enforced material.

11. A refrigerant compressor comprising:
at least one hybrid roller bearing having:
an inner raceway,
an outer raceway, and
a plurality of rollers arranged between the inner raceway and the outer raceway, wherein
the inner raceway and the outer raceway are made from bearing steel and have a first surface RMS roughness $R_{q1}$, wherein
at least one roller is made from a ceramic material and has at least at a rolling surface a second surface RMS roughness $R_{q2}$, and wherein
the roughness of the raceways $R_{q1}$ is 1.2 to 4 times higher than the roughness $R_{q2}$ of the at least one roller.

* * * * *